(12) United States Patent
Ito

(10) Patent No.: US 8,215,438 B2
(45) Date of Patent: Jul. 10, 2012

(54) MOTORCYCLE

(75) Inventor: Shinji Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 234 days.

(21) Appl. No.: 12/709,518

(22) Filed: Feb. 22, 2010

(65) Prior Publication Data

US 2010/0243361 A1  Sep. 30, 2010

(30) Foreign Application Priority Data

Mar. 24, 2009 (JP) ................................. 2009-072088

(51) Int. Cl.
*B62D 61/02* (2006.01)
*B62M 17/00* (2006.01)

(52) U.S. Cl. ...................................................... 180/226

(58) Field of Classification Search .................... 180/226
See application file for complete search history.

(56) References Cited

U.S. PATENT DOCUMENTS

| | | | | |
|---|---|---|---|---|
| 4,664,215 A | * | 5/1987 | Suzuki et al. | 180/226 |
| 4,953,656 A | * | 9/1990 | Kondo et al. | 180/226 |
| 6,182,427 B1 | * | 2/2001 | Loehr | 56/6 |
| 6,427,796 B1 | * | 8/2002 | Tsutsumikoshi | 180/227 |
| 7,810,603 B2 | * | 10/2010 | Kofuji et al. | 180/358 |
| 2007/0199756 A1 | * | 8/2007 | Kofuji | 180/226 |
| 2008/0066986 A1 | * | 3/2008 | Ito et al. | 180/226 |
| 2010/0078250 A1 | * | 4/2010 | Nimura et al. | 180/226 |

FOREIGN PATENT DOCUMENTS

JP  61-200078  9/1986

* cited by examiner

*Primary Examiner* — Lesley D Morris
*Assistant Examiner* — Marlon Arce
(74) *Attorney, Agent, or Firm* — Ditthavong Mori & Steiner, P.C.

(57) ABSTRACT

A motorcycle includes a vehicle body frame, an engine, a pivot shaft, a swing arm, a rear wheel, a gear case, a drive shaft section, and a bearing section. The drive shaft section includes a first drive shaft connected to an output power shaft of the engine through a first universal coupling and a second drive shaft disposed coaxially with the first drive shaft and connected to the first drive shaft through a spline portion to be movable in an axial direction with respect to the first drive shaft. The bearing section restrains relative movement of the first drive shaft and the second drive shaft along a diametrical direction. The bearing section is interposed between an inner circumferential face of one of the first drive shaft and the second drive shaft and an outer circumferential face of another of the first drive shaft and the second drive shaft.

7 Claims, 9 Drawing Sheets

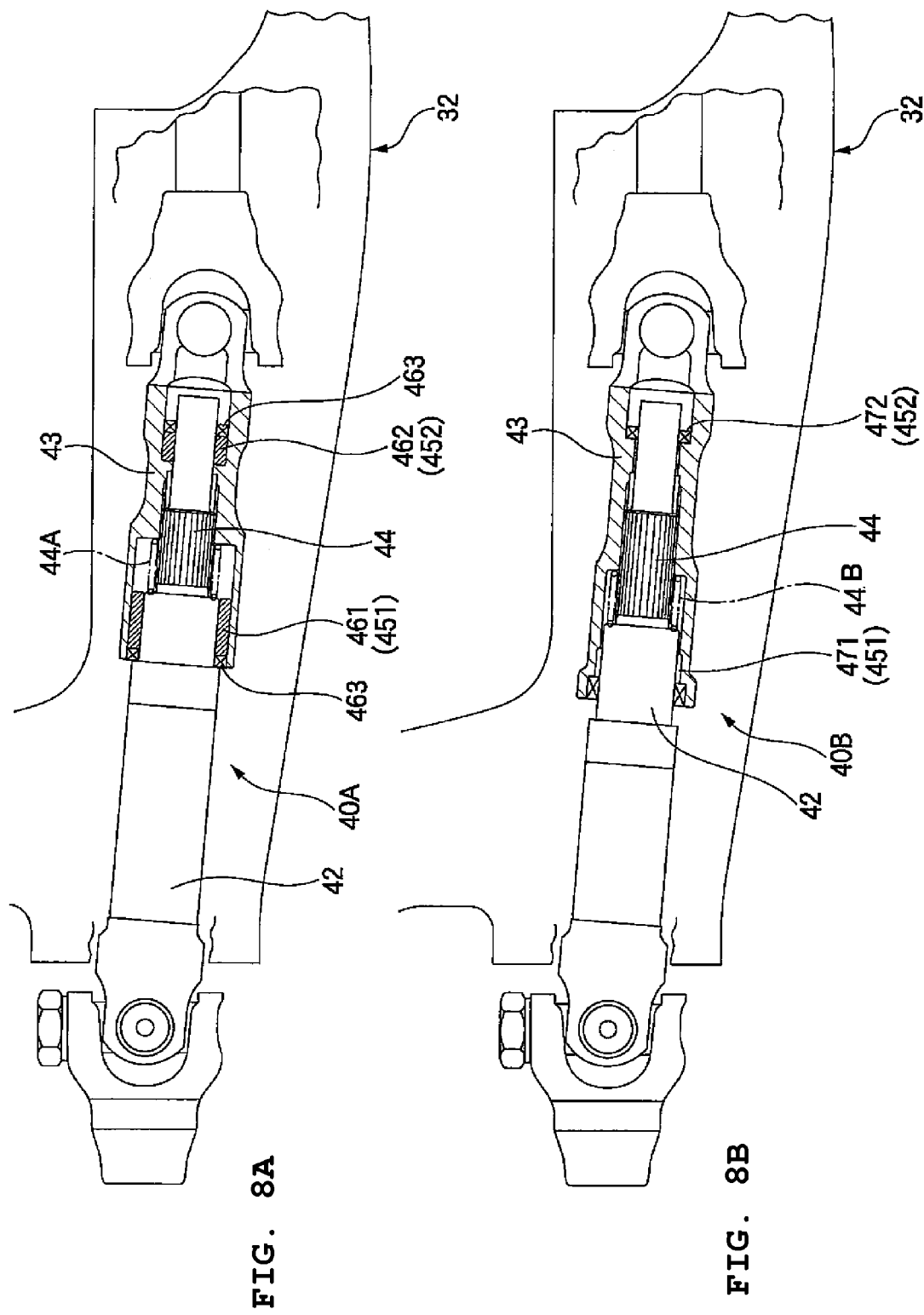

MOTORCYCLE

CROSS-REFERENCE TO RELATED APPLICATIONS

The present application claims priority under 35 U.S.C. §119 to Japanese Patent Application No. 2009-072088, filed Mar. 24, 2009. The contents of this application are incorporated herein by reference in their entirety.

BACKGROUND OF THE INVENTION

1. Field of the Invention

The present invention relates to a motorcycle.

2. Discussion of the Background

Conventionally, a vehicle (motorcycle) for traveling on uneven ground wherein a first drive shaft and a second drive shaft are connected to each other through a universal coupling such as a universal joint in order to cope with a balloon tire which has a great width has been proposed (for example, refer to Japanese Patent Application Publication (KOKAI) No. 61-200078).

The motorcycle disclosed in Japanese Patent Application Publication (KOKAI) No. 61-200078 includes a slip joint provided midway of the first drive shaft so that it can cope with axial length variation of the first drive shaft caused by rocking motion of the swing arm.

Incidentally, in the motorcycle disclosed in Japanese Patent Application Publication (KOKAI) No. 61-200078, the first drive shaft and the second drive shaft separated from each other are connected to each other through the slip joint in the swing arm, or in other words, the first drive shaft and the second drive shaft are connected only to the slip joint. Therefore, the first drive shaft and the second drive shaft can make relative movement in a diametrical direction by an amount corresponding to a tolerance of the slip joint, and it is necessary to pay attention to this.

SUMMARY OF THE INVENTION

According to one aspect of the present invention, a motorcycle includes a vehicle body frame, an engine, a pivot shaft, a swing arm, a rear wheel, a gear case, a drive shaft section, and a bearing section. The engine is carried on the vehicle body frame. The pivot shaft is supported on at least one of the vehicle body frame and the engine. The swing arm is swingably supported on the pivot shaft. The rear wheel is supported on a rear end portion of the swing arm. The gear case is provided on a side portion with respect to the rear wheel. The drive shaft section is provided between an output power shaft of the engine and the gear case to transmit output power of the engine to the rear wheel. The drive shaft section includes a first drive shaft and a second drive shaft. The first drive shaft is connected to the output power shaft through a first universal coupling. The second drive shaft is disposed coaxially with the first drive shaft and connected to the first drive shaft through a spline portion to be movable in an axial direction with respect to the first drive shaft. The bearing section restrains relative movement of the first drive shaft and the second drive shaft along a diametrical direction. The bearing section is interposed between an inner circumferential face of one of the first drive shaft and the second drive shaft and an outer circumferential face of another of the first drive shaft and the second drive shaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 8A and 8B are plan views showing particular examples of the drive shaft section.

DESCRIPTION OF THE EMBODIMENTS

Figure 1:
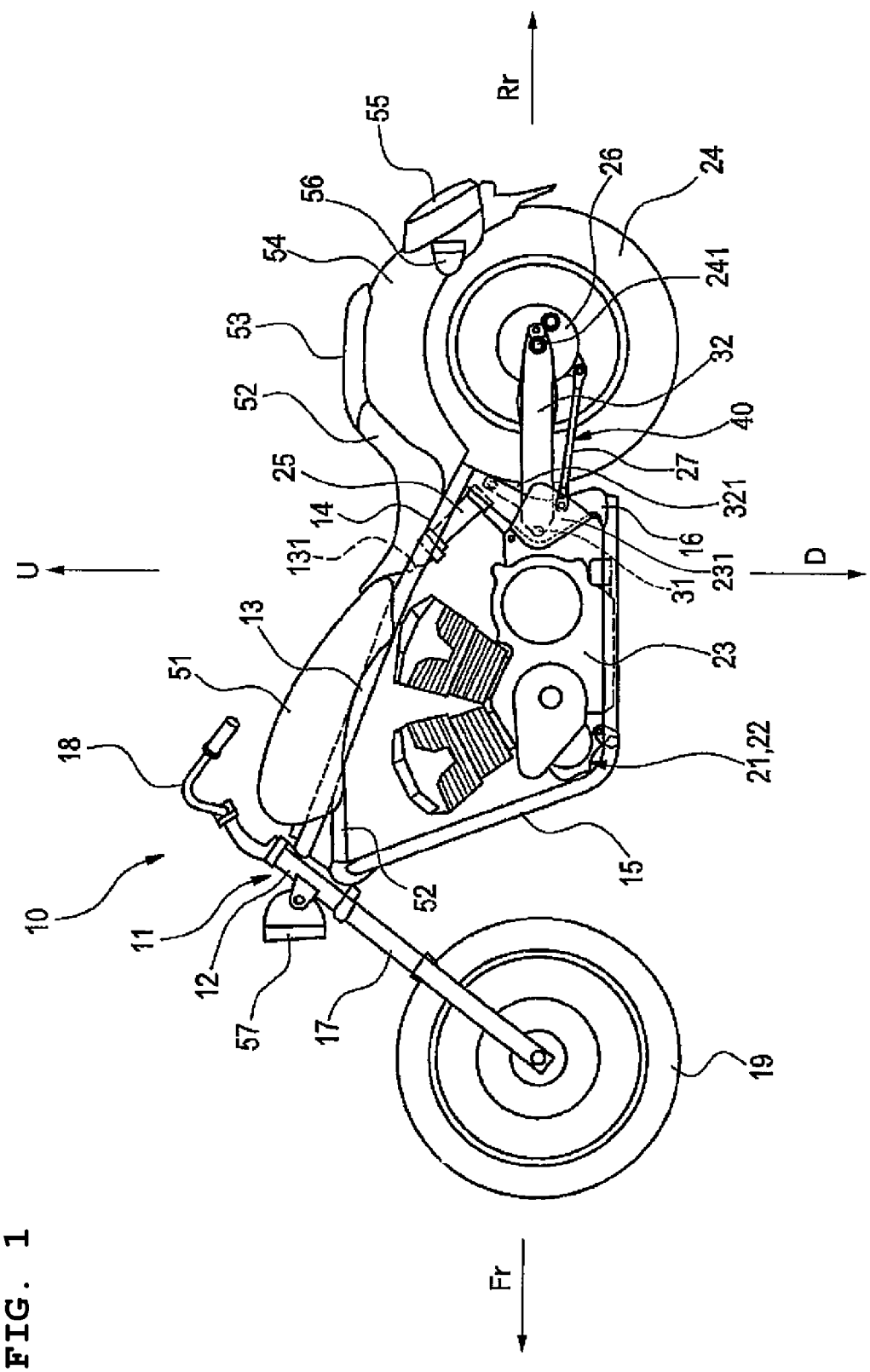
FIG. 1 is a general view showing a motorcycle according to an embodiment of the present invention.

The embodiments will now be described with reference to the accompanying drawings, wherein like reference numerals designate corresponding or identical elements throughout the various drawings.

In the following, a motorcycle according to an embodiment of the present invention is described in detail with reference to the drawings.

It is to be noted that the drawings should be viewed in the direction of reference characters, and in the following description, the forward, rearward, leftward, rightward, upward and downward directions are those as viewed from a rider while, in the drawings, the front side of the vehicle is denoted by Fr, the rear side by Rr, the left side by L, the right side by R, the upper side by U and the lower side by D.

FIG. 1 shows a general view showing a motorcycle 10 according to the embodiment of the present invention.

As shown in FIG. 1, the motorcycle 10 of the present embodiment includes a vehicle body frame 11. The vehicle body frame 11 has a head pipe 12 provided at a front end portion of the vehicle, a main frame 13 extending rearwardly from an upper end portion of the head pipe 12, seat rails 14, 14 (only reference numeral 14 on this side is shown) extending rearwardly from a rear end portion of the main frame 13, down frames 15, 15 (only reference numeral 15 on this side is shown) extending obliquely downwardly from a lower portion of the head pipe 12, and rear frames 16, 16 (only reference numeral 16 on this side is shown) for connecting rear ends of the down frames 15, 15 and rear ends of the seat rails 14, 14 to each other.

A front fork 17 is attached for steering (pivotal) motion to the head pipe 12. A steering handle bar 18 is attached to an upper portion of the front fork 17, and a front wheel 19 is attached for rotation at a lower end portion of the front fork 17. Accordingly, by operating the steering handle bar 18 to the left or the right, the advancing direction of the front wheel 19 can be changed to steer the motorcycle 10.

An engine 22 as a power unit 21 is disposed in a space surrounded by the main frame 13 and the down frames 15. A crankcase 23 serving also as an oil pan and a mission case is provided at a lower portion and a rear portion of the engine 22.

A pivot shaft 31 (hidden by the rear frames 16) whose details are hereinafter described is attached through a rear end portion 231 of the crankcase 23. A swing arm 32 for supporting a rear wheel 24 for rotation at a rear end portion thereof is pivotally movably supported at a front end portion thereof on the pivot shaft 31.

The rear wheel 24 is supported for rotation by a rear wheel axle 241 provided on the swing arm 32. A bracket 321 (refer also to FIG. 6) is provided in an upwardly projecting manner at a front portion of the swing arm 32, and a rear cushion unit 25 is provided between an upper end portion of the bracket 321 and a rear end portion 131 of the main frame 13.

It is to be noted that, where an included angle between a line connecting the center of the pivot shaft 31 and a position at which the rear cushion unit 25 is attached to the bracket 321 and an elongation and contraction axial line 251 of the rear cushion unit 25 is set to approximately 90 degrees, when the rear cushion unit 25 is elongated and contracted upon rocking motion of the swing arm 32 with respect to the vehicle body frame 11, since the rear cushion rocking angle by which the rear cushion unit 25 is rocked with respect to the vehicle body frame 11 around the attached position 25A of the rear cushion unit 25 to the vehicle body frame 11 becomes minimum, the space necessary for the rear cushion rocking motion can be minimized. Besides, since bending stress becomes less likely to be applied to a cushion rod 25B which composes the rear cushion unit 25, the cushion operability is improved.

A gear case 26 is provided on a side portion (left side) with respect to the rear wheel 24, and a drive shaft section 40, details of which are hereinafter described, for transmitting output power of the engine 22 to the rear wheel 24 to drive the rear wheel 24 to rotate is provided in the forward and backward direction on the left side with respect to the rear wheel 24 between the gear case 26 and an output power shaft 221 (refer to FIG. 5) of the engine 22.

It is to be noted that a headlamp 57 is attached forwardly with respect to the head pipe 12 and directed forwardly. Further, a fuel tank 51 is attached above the main frame 13, and a rider's seat 52, a passenger's seat 53 and so forth are attached to the seat rails 14. Further, a rear fender 54 for covering the rear wheel 24 is attached rearwardly with respect to the seat rails 14, and a tail lamp 55 and a rear indicator 56 are attached to a rear portion of the rear fender 54.

Figure 2:
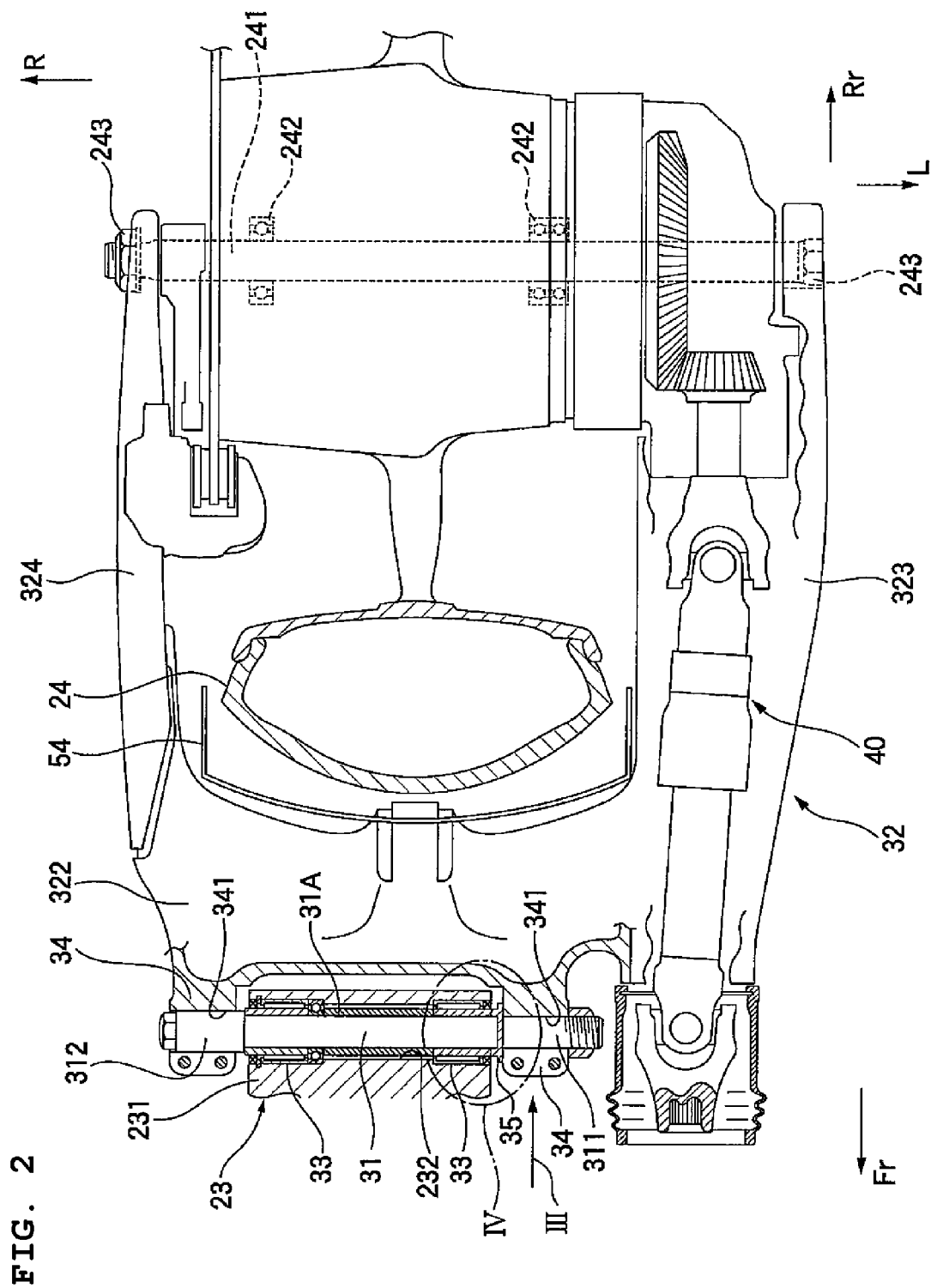
FIG. 2 is a sectional view of a swing arm taken along a plane which passes a pivot shaft and a rear wheel axle.

FIG. 2 shows a sectional view of the swing arm 32 taken along a plane which passes the pivot shaft 31 and the rear wheel axle 241.

As shown in FIG. 2, a pivot hole 232 is provided in the rear end portion 231 of the crankcase 23 such that it extends through the rear end portion 231 in a widthwise direction (upward and downward direction in FIG. 2) of the vehicle body frame 11, and the pivot shaft 31 is fitted in the pivot hole 232. Bearings 33, 33 which are bearing members are provided between an outer circumferential face of the pivot shaft 31 and an inner circumferential face of the pivot hole 232, and the pivot shaft 31 is supported for rotation in the pivot hole 232. The pivot shaft 31 is attached to the rear end portion 231 of the crankcase 23 and has projecting portions 311 and 312 on the left and the right thereof.

It is to be noted that, for the bearing members, not only the bearings 33 but also bearing members which allow the pivot shaft 31 to rotate relative to the crankcase 23 such as bushes can be used.

The swing arm 32 has a body portion 322 and left and right arm portions 323 and 324 extending rearwardly from the opposite left and right outer sides of the body portion 322 and generally exhibits a channel shape. The rear wheel axle 241 is secured at the opposite end portions thereof between rear end portions of the arm portions 323 and 324 by nuts 243, and the rear wheel 24 is supported for rotation relative to the rear wheel axle 241 through bearings 242.

A pair of left and right pivot portions 34, 34 is provided at the front end of the body portion of the swing arm 32 such that they project forwardly. The pair of pivot portions 34, 34 is provided in such a manner as to sandwich the rear end portion 231 of the crankcase 23 along the widthwise direction of the vehicle body frame 11, and a through-hole 341 in which the pivot shaft 31 is fitted is formed. The projecting portions 311 and 312 of the pivot shaft 31 are attached to the through-holes 341.

Figure 3A:
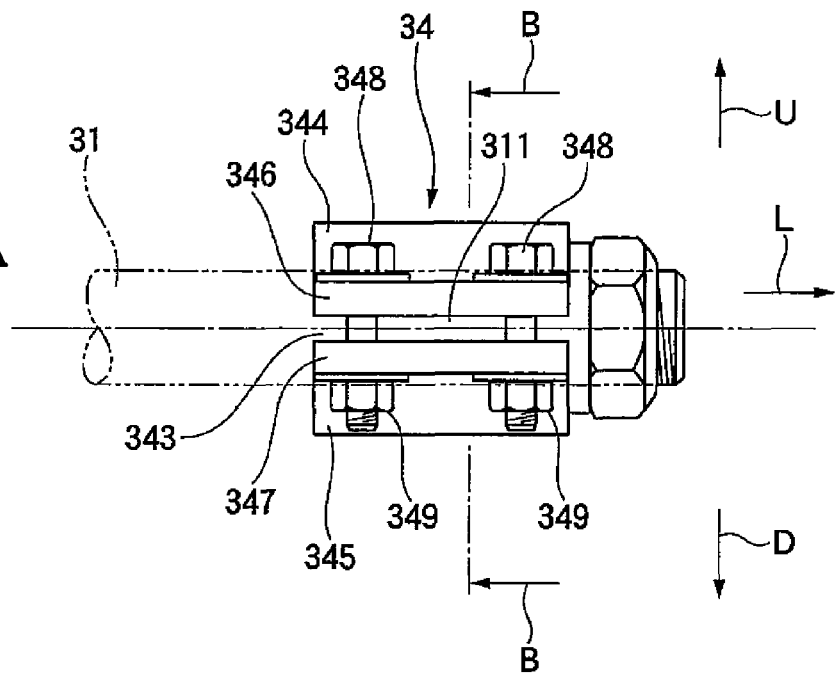
FIG. 3A is an enlarged view as viewed in the direction of III in FIG. 2
Figure 3B:
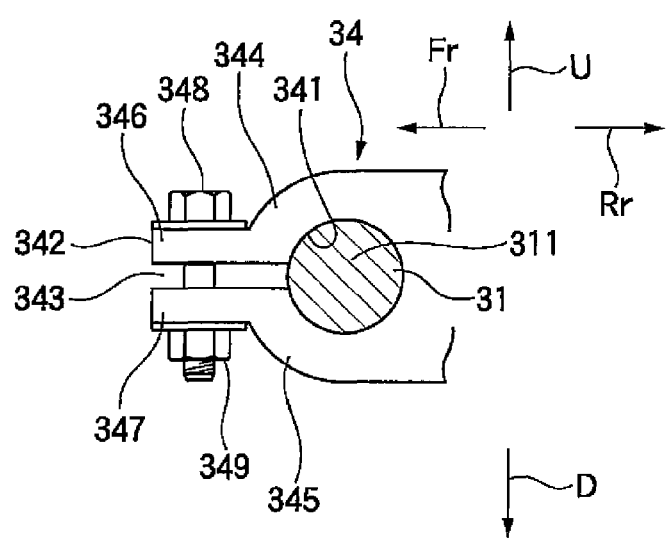
FIG. 3B is a sectional view at a B-B position in FIG. 3A.

FIG. 3A is an enlarged view as viewed in a III direction in FIG. 2, and FIG. 3B shows a sectional view at a B-B position in FIG. 3A.

As shown in FIGS. 3A and 3B, the pivot portion 34 is divided into an upper pivot portion 344 and a lower pivot portion 345 by a slit 343 which continues from an outer side 342 of the pivot portion 34 to an inner face of the through-hole 341. Both split tightening portions 346 and 347 each in the form of a plate are provided in a projecting manner on the upper and lower pivot portions 344 and 345, and a bolt 348 and a nut 349 which are fastening members are provided in the upward and downward direction through each of the split tightening portions 346 and 347.

It is to be noted that, while, in FIGS. 3A and 3B, the slit 343 is shown as a horizontal linear slit, the slit 343 may have some other shape.

Further, female threads may be formed directly on the split tightening portion 347 without using the nut 349.

Accordingly, in order to join the swing arm 32 and the pivot shaft 31 together, the projecting portions 311 and 312 of the pivot shaft 31 are fitted into the through-holes 341 of the pivot portions 34. Then, the bolts 348 and the nuts 349 at the split tightening portions 346 and 347 are tightened to reduce the widthwise dimension of the slit 343 to hold the pivot shaft 31 between the upper and lower pivot portions 344 and 345. By securing the pivot portions 34 to the pivot shaft 31 in this manner, the swing arm 32 is secured integrally to the pivot shaft 31.

Figure 4:
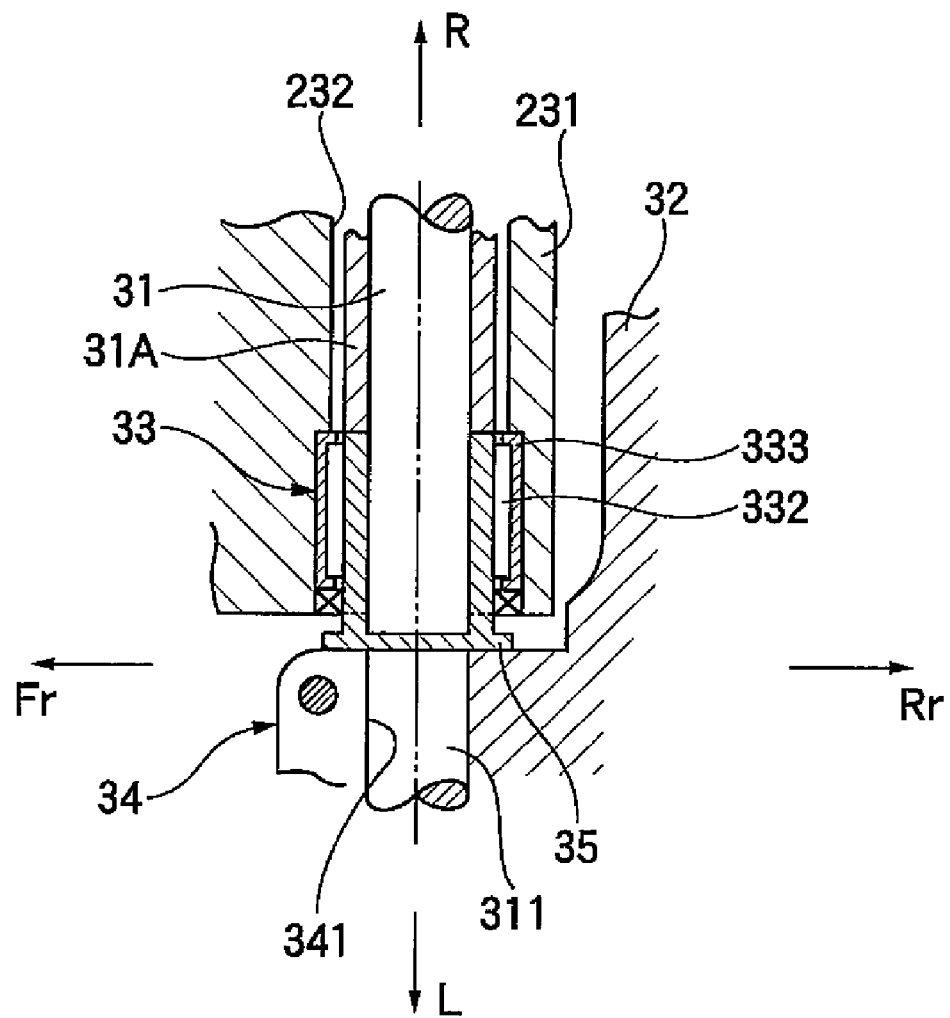
FIG. 4 is an enlarged view of a IV portion in FIG. 2.

FIG. 4 is an enlarge view of a IV portion in FIG. 2.

As shown in FIG. 4, a pivot collar 35 is fitted on the pivot shaft 31 between the rear end portion 231 of the crankcase 23 and one (left side one in FIG. 2) of the pivot portions 34 of the swing arm 32. The pivot collar 35 exhibits a cylindrical shape having a generally L-shaped circumferential wall and contacts at one end face thereof with a side face of the pivot portion 34 and at the other end face thereof with an end face of a pivot shaft collar 31A which accommodates the pivot shaft 31 in the pivot hole 232 of the rear end portion 231 of the crankcase 23.

The bearing 33 is supported, at the pivot collar 35 thereof secured to the outer circumferential face of the pivot shaft 31 and an outer race 333 of a cylindrical shape thereof secured to the inner circumferential face of the pivot hole 232 of the crankcase 23, for rotation through a plurality of rollers 332 provided along a circumferential direction.

In particular, the pivot shaft 31 can rotate with respect to the crankcase 23 but does not rotate with respect to the pivot portion 34 because the pivot collar 35 secured to the pivot shaft 31 functions as an inner race of the bearing 33.

Figure 5:
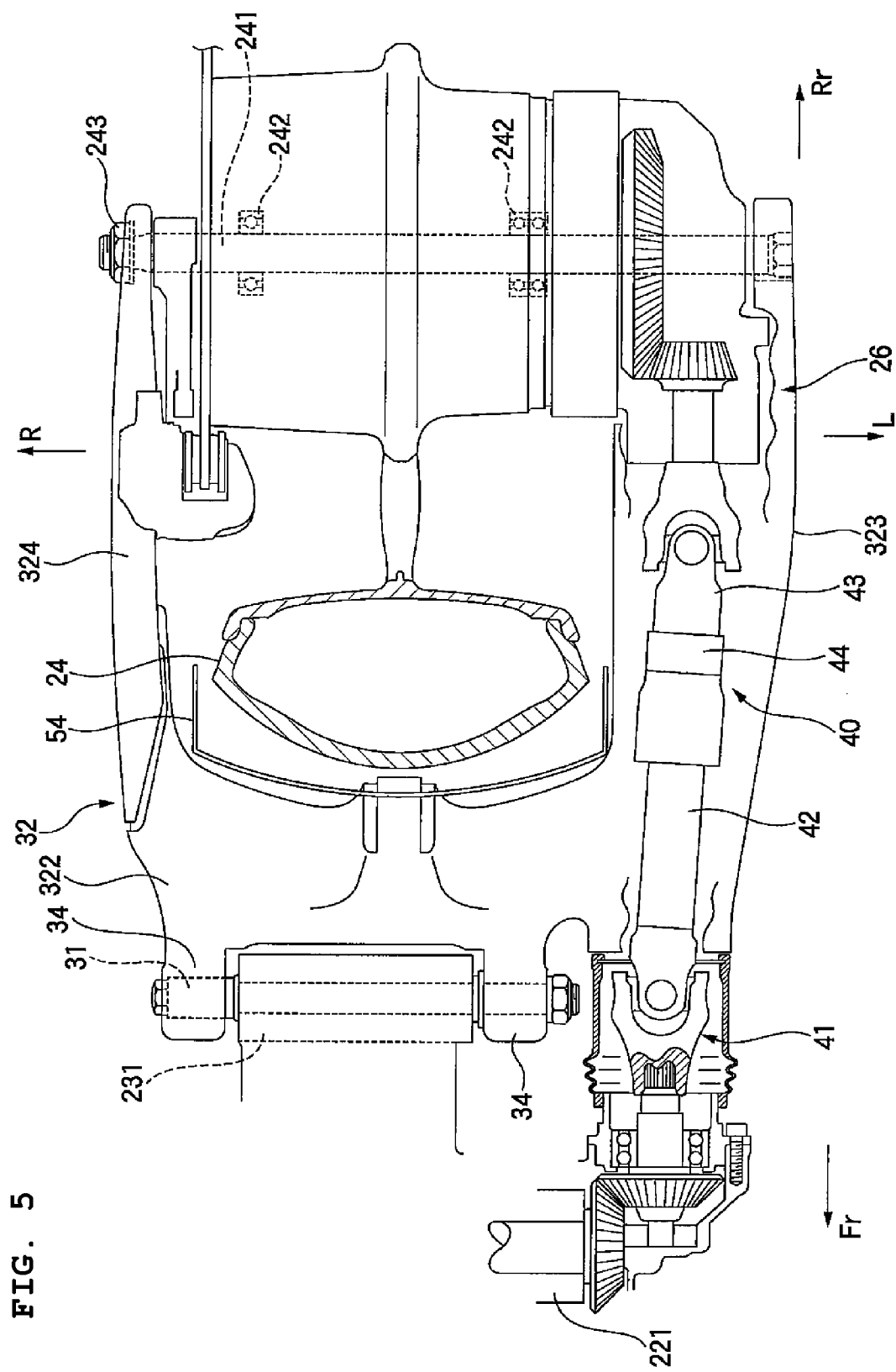
FIG. 5 is a plan view of a drive shaft section.

FIG. 5 shows a plan view of the drive shaft section 40.

As shown in FIG. 5, the drive shaft section 40 has a first drive shaft 42 connected to the output power shaft 221 of the engine 22 through a first universal coupling 41 such as a universal joint, and a second drive shaft 43 disposed coaxially with respect to the first drive shaft. The second drive shaft 43 is connected to the first drive shaft 42 through a spline portion 44 such that it can move in an axial direction (forward and backward direction) in a state wherein relative rotation thereof to the first drive shaft 42 is restrained.

Here, the drive shaft section 40 is accommodated in the inside of the swing arm 32, and the swing arm 32 plays a roll of a cover for protecting the drive shaft section 40.

A bearing section 45 is interposed between an inner circumferential face of one of the first drive shaft 42 and the second drive shaft 43 and an outer circumferential face of another of the first drive shaft 42 and the second drive shaft 43. The bearing section 45 restrains unnecessary movement of the first drive shaft 42 and the second drive shaft 43 in a relative diametrical direction.

The bearing section 45 has a first bearing 451 provided on the first drive shaft 42 side (that is, on the front side) with respect to the spline portion 44, and a second bearing 452 provided on the second drive shaft 43 side (that is, on the rear side) with respect to the spline portion 44. The bearing section 45 is force-fitted on at least one of the first drive shaft 42 and the second drive shaft 43. In particular, the first bearing 451 is force-fitted on the first drive shaft 42, and the second bearing 452 is force-fitted on the second drive shaft 43.

Figure 6:
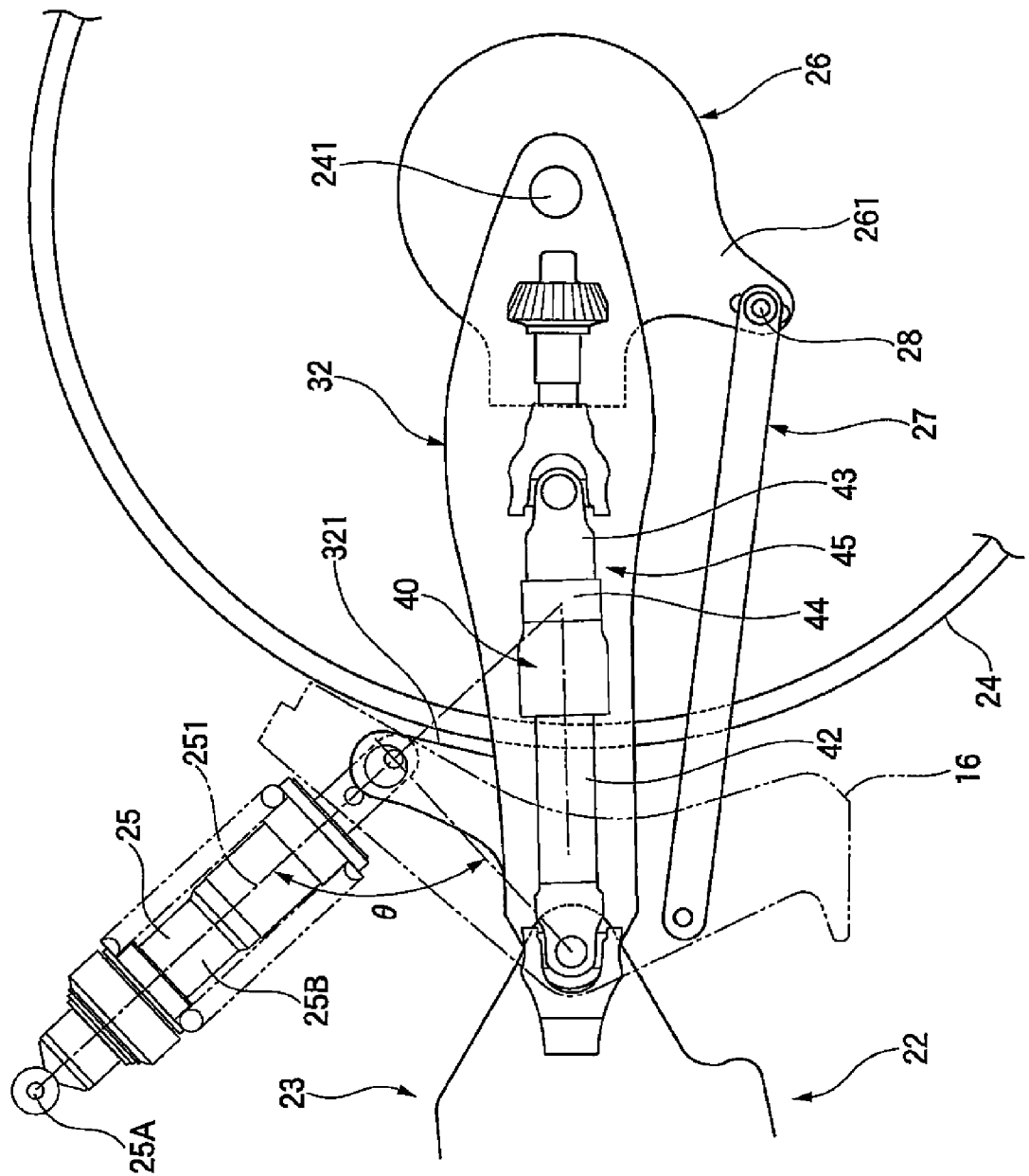
FIG. 6 is a side elevational view of the drive shaft section.

FIG. 6 shows a side elevational view of the drive shaft section 40.

As shown in FIG. 6, the gear case 26 has a generally disk shape and can be pivoted with respect to the rear wheel axle 241 and the swing arm 32 around the rear wheel axle 241. A torque rod attaching bracket 261 is provided in a projecting manner on the gear case 26, and a torque rod 27 for restraining pivotal motion of the gear case 26 is attached between the torque rod attaching bracket 261 and the rear frame 16 of the vehicle body frame 11. On the torque rod 27, an adjustment mechanism for adjusting the length of the torque rod 27 may be provided on the rear wheel 24 side or the gear case 26 side.

It is to be noted that the torque rod 27 is attached to the gear case 26 through an eccentric adjuster 28 (which may otherwise be a snail cam) such that, by rotating the eccentric adjuster 28, the angle of the gear case 26 can be adjusted readily.

Figure 7A:
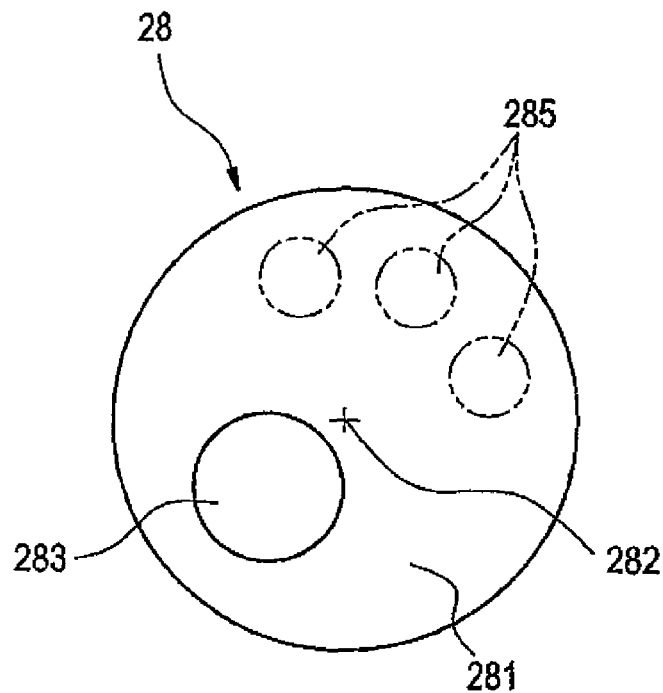
FIG. 7A is a top plan view of an eccentric adjuster and FIG. 7B is a side elevational view as viewed from a B direction in FIG. 7A.
Figure 7B:
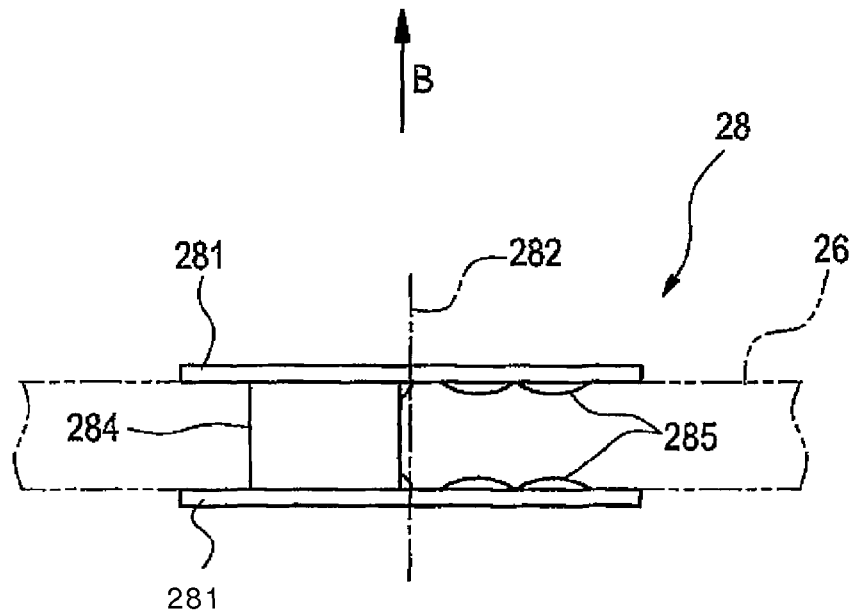

For example, as shown in FIGS. 7A and 7B, the eccentric adjuster 28 has two disks 281 which sandwich the gear case 26. An attaching hole 283 is provided eccentrically from a center 282 of rotation on each of the disks 281, and the attaching holes 283 of the disks 281 are connected to each other by a connecting pipe 284. A plurality of protrusions 285 are provided on an outer circumferential edge of each of the disks 281 such that they project to the inner side. The protrusions 285 are fitted into recessed portions (not shown) provided at a predetermined position of the gear case 26 to determine a rotational position of the eccentric adjuster 28.

Accordingly, a rear end of the torque rod 27 is temporarily attached to the attaching holes 283 (connecting pipe 284), and the disks 281 are rotated to adjust the positional relationship between the attached position of the torque rod 27 and the attached position of the gear case 26. Thereafter, the torque rod 27 is fastened regularly to the attaching holes 283 to secure the eccentric adjuster 28 to the gear case 26. Consequently, the rotational angle of the gear case 26 with respect to the rear wheel axle 241 can be adjusted.

FIGS. 8A and 8B show particular examples of the drive shaft section 40.

In the drive shaft section 40A shown in FIG. 8A, bushes 461 and 462 are used as the first bearing 451 and the second bearing 452, respectively. A seal 463 is provided at a front end portion of the bush 461 and a rear end portion of the bush 462.

The drive shaft section 40A is biased by a compression spring 44A provided between the first drive shaft 42 and the second drive shaft 43 in a direction in which the first drive shaft 42 and the second drive shaft 43 are spaced away from each other.

The compression spring 44A is provided at a position at which it surrounds the spline portion 44 between the bush 461 and the bush 462 and is covered with the second drive shaft 43.

Meanwhile, in the drive shaft section 40B shown in FIG. 8B, a metal bush 471 is used as the first bearing 451 while the second bearing portion is not provided but a seal 472 is provided.

The drive shaft section 40B is biased by a compression spring 44B provided between the first drive shaft 42 and the second drive shaft 43 in a direction in which the first drive shaft 42 and the second drive shaft 43 are spaced away from each other.

The compression spring 44B is provided at a position at which it surrounds the spline portion 44 between the metal bush 471 and a small diameter portion 43A and is covered with the second drive shaft 43.

As described above, according to the motorcycle 10 of the present embodiment, the drive shaft section 40 provided between the output power shaft 221 of the engine 22 and the gear case 26 for transmitting output power of the engine 22 to the rear wheel 24 is formed from the first drive shaft 42 connected to the output power shaft 221 and the second drive shaft 43 disposed coaxially with the first drive shaft 42, and both drive shafts 42 and 43 are connected to each other through the spline portion 44. Consequently, the second drive shaft 43 can move along the axial direction with respect to the first drive shaft 42. Therefore, the drive shaft section 40 can be elongated and contracted. Further, since the bearing section 45 is interposed between the first drive shaft 42 and the second drive shaft 43, relative movement between the first drive shaft 42 and the second drive shaft 43 along a diametrical direction can be restrained, and unnecessary relative movement upon cruising traveling can be absorbed.

Further, according to the motorcycle 10 of the present embodiment, since the bearing section 45 is formed from the first bearing 451 provided on the first drive shaft 42 side with respect to the spline portion 44 and the second bearing 452 provided on the second drive shaft 43 side with respect to the spline portion 44, unnecessary relative movement in a diametrical direction can be prevented with a higher degree of certainty.

Further, according to the motorcycle 10 of the present embodiment, the first bearing 451 or the second bearing 452 which form the bearing section 45 is force-fitted on at least one of the first drive shaft 42 and the second drive shaft 43. In other words, since the first bearing 451 is force-fitted on the first drive shaft 42 and the second bearing 452 is force-fitted on the second drive shaft 43, unnecessary relative movement in a diametrical direction can be prevented with a higher degree of certainty.

Further, according to the motorcycle 10 of the present embodiment, since the gear case 26 can be pivoted with respect to the rear wheel axle 241 and the swing arm 32 and is restrained from pivotal motion by the torque rod 27 extending from the rear frames 16, the first drive shaft 42 and the second drive shaft 43 of the drive shaft section 40 relatively move in the axial direction in response to movement of the torque rod 27, and unnecessary relative movement in a diametrical direction can be prevented with a higher degree of certainty. Thus, a jack up phenomenon upon acceleration or the like can be eliminated.

Further, since positioning of the swing arm 32 in the vehicle widthwise direction is carried out by tightening by means of the pivot shaft 31 and then the pivot portions 34 are secured to the swing arm 32 by tightening by means of the bolt 348 and the nut 349, the bearing section of the swing arm can be made compact. Further, a dimensional error or an assembly error of the pivot shaft 31 or the swing arm 32 can be absorbed and a good assembly performance is obtained, and besides the pivot shaft 31 and the swing arm 32 can be firmly secured integrally.

Further, since the axial directions for fastening of the pivot shaft 31 and the crankcase 23 are same as each other, the axial force for fastening of the swing arm 32 can be utilized as the axial force for fastening of the crankcase 23.

It is to be noted that the motorcycle 10 of the present invention is not limited to the embodiment described above, but suitable modification, improvement and so forth are possible.

Figure 9:
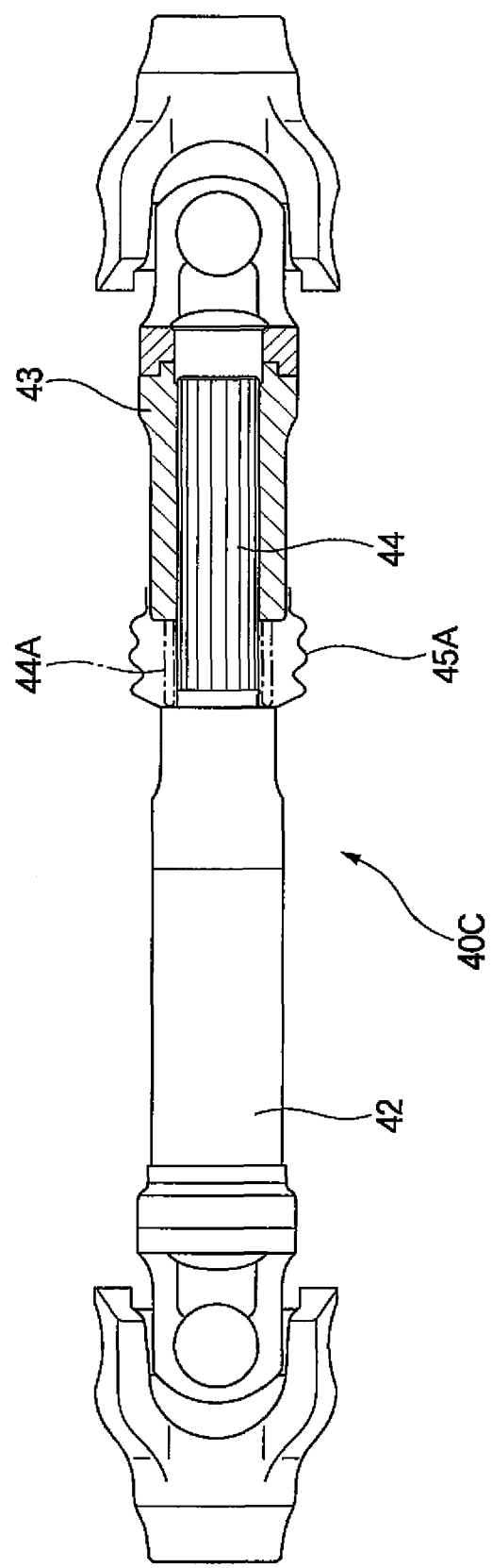
FIG. 9 is a plan view showing a modification to the drive shaft section.

For example, in the embodiment described hereinabove, the drive shaft section is configured such that a bush or a metal bush is used for the first bearing and the second bearing between the first drive shaft and the second drive shaft, and includes the seal. However, also a drive shaft section 40C shown in FIG. 9 is embraced in the present invention.

In particular, in the drive shaft section 40C shown in FIG. 9, the bush, metal bush and seal described hereinabove are omitted, and the compression spring 44A is provided at a position at which it surrounds the spline portion 44 which is exposed between the first drive shaft 42 and the second drive shaft 43. The compression spring 44A is covered with a boot in the form of bellows stretched between the first drive shaft 42 and the second drive shaft 43.

In such a drive shaft section 40C as just described, since the location at which the bush, metal bush or seal is disposed in the drive shaft portions 40A and 40B can be used as the spline portion 44, a longer meshing dimension of the spline portion 44 can be assured in comparison with the drive shaft portions 40A and 40B described hereinabove in connection with the embodiment. Consequently, even if the first drive shaft 42 and the second drive shaft 43 are spaced from each other, the meshing strength can be maintained.

According to the motorcycle of the embodiment of the invention, the drive shaft section provided between the output power shaft of the engine and the gear case for transmitting output power of the engine to the rear wheel is configured from the first drive shaft connected to the output power shaft and the second drive shaft disposed coaxially with the first drive shaft, and the two drive shafts are connected to each other through the spline portion. Therefore, the second drive shaft can move along the axial direction with respect to the first drive shaft. Therefore, the drive shaft section can be extended and contracted. Further, since the bearing section is interposed between the first drive shaft and the second drive shaft, relative movement between the first drive shaft and the second drive shaft in a diametrical direction can be restrained, and unnecessary relative movement upon cruising traveling can be absorbed.

According to the motorcycle of the embodiment of the invention, the bearing section is configured from the first bearing provided on the first drive shaft side with respect to the spline portion and the second bearing provided on the second drive shaft side with respect to the spline portion. Therefore, unnecessary relative movement in a diametrical direction can be prevented with a higher degree of certainty.

According to the motorcycle of the embodiment of the invention, the first bearing or the second bearing which configure the bearing section is force-fitted on one of the first drive shaft and the second drive shaft. Therefore, unnecessary relative movement in a diametrical direction can be prevented with a higher degree of certainty.

According to the motorcycle of the embodiment of the invention, the gear case is mounted to be pivotally movable with respect to the axle of the rear wheel and the swing arm but is restrained from pivotal motion by the torque rod extending from the vehicle body frame. Therefore, the first drive shaft and the second drive shaft of the drive shaft section relatively move in the axial direction in response to movement of the torque rod, and unnecessary relative movement in a diametrical direction can be prevented with a higher degree of certainty. Thus, a jack up phenomenon upon acceleration or the like can be eliminated.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A motorcycle comprising:
    a vehicle body frame;
    an engine carried on the vehicle body frame;
    a pivot shaft supported on at least one of the vehicle body frame and the engine;
    a swing arm swingably supported on the pivot shaft;
    a rear wheel supported on a rear end portion of the swing arm;
    a gear case provided on a side portion with respect to the rear wheel;
    a drive shaft section provided between an output power shaft of the engine and the gear case to transmit output power of the engine to the rear wheel, the drive shaft section comprising:
        a first drive shaft connected to the output power shaft through a first universal coupling; and
        a second drive shaft disposed coaxially with the first drive shaft and connected to the first drive shaft through a spline portion to be movable in an axial direction with respect to the first drive shaft; and
    a bearing section to restrain relative movement of the first drive shaft and the second drive shaft along a diametrical direction, the bearing section being interposed between an inner circumferential face of one of the first drive shaft and the second drive shaft and an outer circumferential face of another of the first drive shaft and the second drive shaft,
    wherein the bearing section comprises:
        a first bearing provided on the first drive shaft side with respect to the spline portion; and
        a second bearing provided on the second drive shaft side with respect to the spline portion.

2. The motorcycle according to claim 1, wherein the bearing section is force-fitted on at least one of the first drive shaft and the second drive shaft.

3. The motorcycle according to claim 1, wherein the gear case is mounted to be pivotally movable with respect to an axle of the rear wheel and the swing arm but is restrained from pivotal motion by a torque rod extending from the vehicle body frame.

4. The motorcycle according to claim 1, wherein the bearing section is force-fitted on at least one of the first drive shaft and the second drive shaft.

5. A drive shaft coupling for a vehicle, said drive shaft coupling comprising:

a drive shaft section configured to transmit output power of an engine to a wheel of the vehicle, the drive shaft section comprising:
  a first drive shaft configured to be connected to engine; and
  a second drive shaft disposed coaxially with the first drive shaft and connected to the first drive shaft through a spline portion to be movable in an axial direction with respect to the first drive shaft; and
a bearing section interposed between an inner circumferential face of one of the first drive shaft and the second drive shaft and an outer circumferential face of another of the first drive shaft and the second drive shaft.

6. The drive shaft coupling according to claim 5, wherein the bearing section comprises:
  a first bearing provided on the first drive shaft side with respect to the spline portion; and
  a second bearing provided on the second drive shaft side with respect to the spline portion.

7. The drive shaft coupling according to claim 6, wherein the bearing section is force-fitted on at least one of the first drive shaft and the second drive shaft.

* * * * *